(12) United States Patent
Avanes et al.

(10) Patent No.: US 12,021,931 B2
(45) Date of Patent: Jun. 25, 2024

(54) BSF SERVICE REGISTRATION AND DISCOVERY ENHANCEMENT

(71) Applicant: Verizon Patent and Licensing Inc., Basking Ridge, NJ (US)

(72) Inventors: Robert Avanes, Roanoke, TX (US); Violeta Cakulev, Millburn, NJ (US); Hossein M. Ahmadi, Parsippany, NJ (US); Jerry Steben, Fort Worth, TX (US); Lalit R. Kotecha, San Ramon, CA (US); Ali Imdad Malik, East Brunswick, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/933,496

(22) Filed: Sep. 20, 2022

(65) Prior Publication Data

US 2024/0098146 A1    Mar. 21, 2024

(51) Int. Cl.
*H04L 67/14* (2022.01)
*H04L 67/51* (2022.01)

(52) U.S. Cl.
CPC .............. *H04L 67/14* (2013.01); *H04L 67/51* (2022.05)

(58) Field of Classification Search
CPC ................................ H04L 67/14; H04L 67/51
See application file for complete search history.

(56) References Cited

U.S. PATENT DOCUMENTS

| | | | |
|---|---|---|---|
| 2004/0246991 A1* | 12/2004 | Tsuzuki | H04L 69/167 370/466 |
| 2008/0311917 A1* | 12/2008 | Marathe | H04W 8/04 455/445 |
| 2020/0275255 A1* | 8/2020 | Wang | H04W 8/20 |
| 2021/0227625 A1* | 7/2021 | Wang | H04W 8/186 |
| 2021/0258861 A1* | 8/2021 | Wang | H04L 67/51 |
| 2022/0022101 A1* | 1/2022 | Wang | H04M 15/66 |

FOREIGN PATENT DOCUMENTS

| | | | | |
|---|---|---|---|---|
| CN | 115314875 A | * | 11/2022 | |
| EP | 4274195 A1 | * | 11/2023 | ......... H04L 61/3025 |
| WO | WO-2020020295 A1 | * | 1/2020 | ............ H04W 76/11 |
| WO | WO-2022075701 A1 | * | 4/2022 | |

* cited by examiner

*Primary Examiner* — Thu V Nguyen
*Assistant Examiner* — Ranjan Pant (57) ABSTRACT

Systems and methods described herein provide binding support function (BSF) service registration and discovery for environments using oversubscribed network addresses. A network device in a core network receives a registration request from a binding support device. The registration request includes a binding group identifier associated with the binding support device. The network device stores, based on the registration request, a profile for the binding support device that includes the binding group identifier and receives, from a policy control device, a discovery request for a that includes a unique identifier of user equipment (UE) device. The network device provides, to the policy control device, a response to the discovery request that identifies the binding support device.

20 Claims, 7 Drawing Sheets

Definition of type BsfInfo

| Attribute name | Data type | P | Cardinality | Description |
|---|---|---|---|---|
| 405 → ipv4AddressRanges | array(Ipv4AddressRange) | O | 1..N | List of ranges of IPv4 addresses handled by BSF. If not provided, the BSF can serve any IPv4 address. |
| 410 → dnnList | array(Dnn) | O | 1..N | List of DNNs handled by the BSF. If not provided, the BSF can serve any DNN. |
| 415 → ipDomainList | array(string) | O | 1..N | List of IPv4 address domains, as described in clause 6.2 of GPP 29.513 [28], handled by the BSF. If not provided, the BSF can serve any IP domain. |
| 420 → ipv6PrefixRanges | array(Ipv6PrefixRange) | O | 1..N | List of ranges of IPv6 prefixes handled by the BSF. If not provided, the BSF can serve any IPv6 prefix. |
| 425 → groupid | NfGroupID | MV | 0..1 | Identify of the SUPI/IMSI group that is servcie by the BSF instance/group. |

BSF SERVICE REGISTRATION AND DISCOVERY ENHANCEMENT

BACKGROUND INFORMATION

The increasing number of devices that are connected to the Internet has exceeded the number that can be supported with unique address values using Internet Protocol version 4 (IPv4). IPv6 is a successor protocol for IPv4 and partly address the problem of IPv4 address exhaustion by providing many more available IP addresses. However, IPv6 is not backward compatible with IPv4, and many users continue to rely on IPv4 for Internet connectivity. Effective management of oversubscribed and/or duplicate IPv4 addresses is required to avoid adverse impacts to network services.

DETAILED DESCRIPTION OF EXAMPLE EMBODIMENTS

The following detailed description refers to the accompanying drawings. The same reference numbers in different drawings identify the same or similar elements.

Much of the Internet is still dependent on IPv4, even though IPv6 has been available for a number of years. Since IPv4 public addresses are scarce, telecommunications carriers use carrier-grade Network Address Translation (CG-NAT) solutions to enable many subscribers to share an IPv4 address. In the CG-NAT solution, each subscriber is allocated a set of ports associated with a specific public IPv4 address for their flows. As the subscriber sets up a new connection (or flow), gateway devices in the carrier's core network will automatically assign a port for that flow, and the flow will retain that port until the flow is closed.

However, in large service provider networks, the size of private IPv4 subnet allocated under CG-NAT standards is much smaller than the size of the customer base that needs private IPv4 addresses. As such, for a large service provider, at least one private IPV4 address (if not many more) is likely to be the same between two subscribers on different instances of a network function, such as a Session Management Function (SMF) or User Plane Function (UPF) of a 5G core network.

When such deployments are present, existing binding support function (BSF) procedures to register and service consumer Network Functions (NFs) are limited or unusable. For example, using "IPv4AdddressRange" (e.g., when private IP addresses are commonly used on SMF or UPF and translated to end user device), the user device or another network function may not be able to locate a session using a duplicate IPv4 address.

Systems and methods described herein provide a solution for BSF service registration to a network repository function (NRF) and subsequent discovery process for service providers whose user devices or network components are oversubscribed to private IP addresses (such as IPv4 addresses). According to implementations described herein, BSF service registration and discovery may take place for an identified group, referred to herein as a "BSF Group," such as a group of International Mobile Subscriber Identities (IMSIs) or Subscription Permanent Identifiers (SUPIs). The group may be defined using a new attribute, referred to as a "BSFGroupID," included at a Subscriber Locator Function (SLF), for example, accessible to the NRF. The BSFgroupID at the SLF may constitute a set of globally unique device identifiers (e.g., a range or non-contiguous set of IMSIs/SUPIs) of provisioned subscribers. BSF services may employ the BSF Group during registration to the NRF, for example. Consumer NFs may query the NRF and discover which BSF serves a particular BSF Group.

Figure 1:
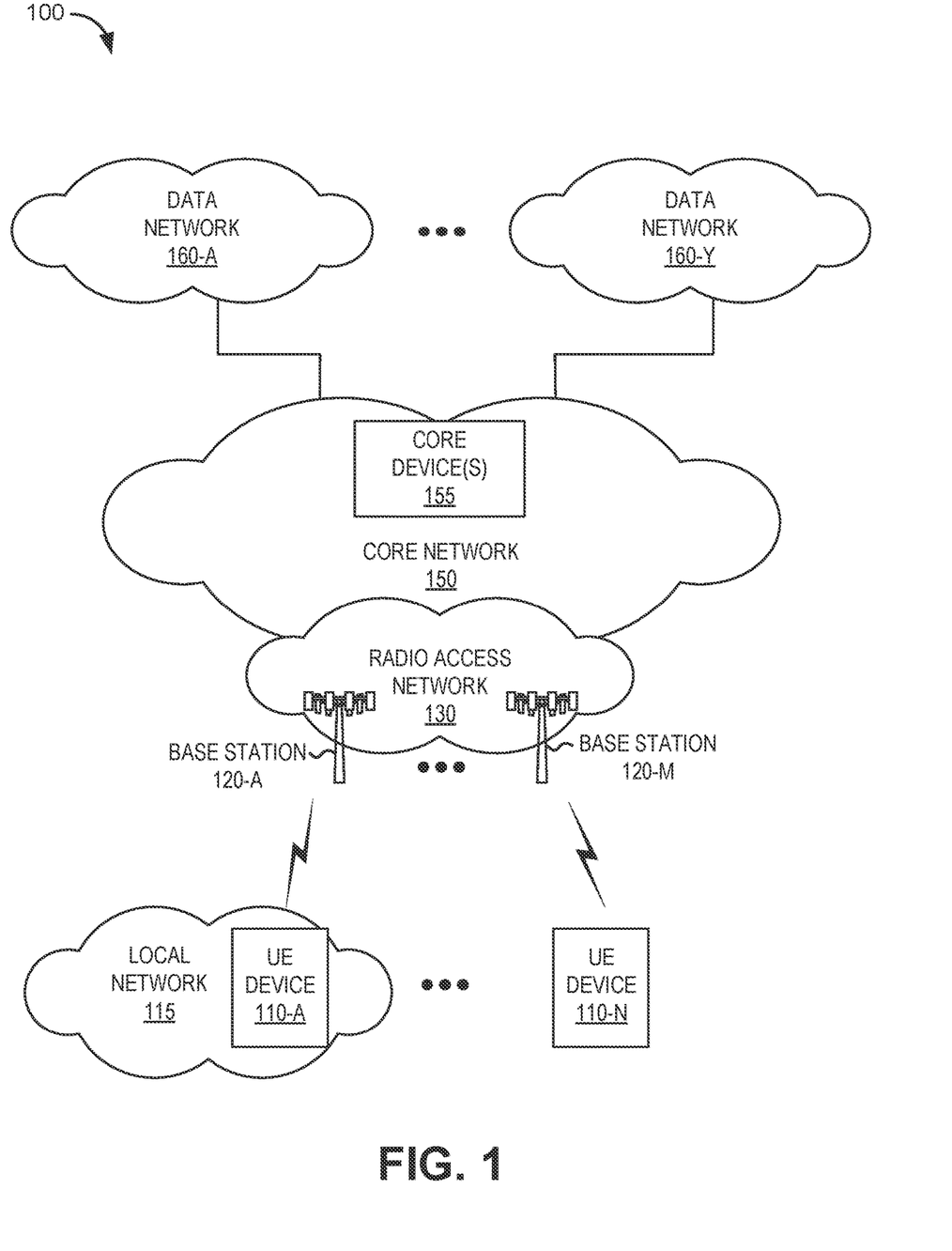
FIG. 1 illustrates an environment according to an implementation described herein.

FIG. 1 is a diagram of an environment 100 in which the systems and/or methods described herein may be implemented. As shown in FIG. 1, environment 100 may include UE devices 110-A to 110-N, radio access network (RAN) 130 that includes base stations 120-A to 120-M, core network 150 that includes network device(s) 155, and Data Networks (DNs) 160-A to 160-Y.

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a wristwatch computer device, etc.); a laptop computer, a tablet computer, or another type of portable computer; a desktop computer; a customer premises equipment (CPE) device, such as a set-top box or a digital media player, a Wi-Fi access point, a smart television, etc.; a portable gaming system; a global positioning system (GPS) device; a home monitoring device; an IoT device and/or any other type of computer device with wireless communication capabilities. UE device 110 may include capabilities for voice communication, mobile broadband services (e.g., video streaming, real-time gaming, premium Internet access etc.), best effort data traffic, and/or other types of applications. In some implementations, UE device 110 may communicate using machine-to-machine (M2M) communication, such as Machine Type Communication (MTC) for Internet of Things (IoT) applications.

In some instances, UE device 110 may be connected from within a local network 115. Local network 115 may include a private network (e.g., a customer network, an in-house network, etc.) which may include a local area network (LAN), a wide area network (WAN), or a combination of networks. Local network 115 may provide network access to devices in core network 150 or serve as a stand-alone network. Different local networks 115 may have different network identifiers and may assign private IP address (e.g., that are not globally unique) to UE devices 110. Thus, Network Address Translation (NAT) and/or CG-NAT may be required for core network 150 to provide public IP addresses that can be used when accessing DNs 160.

Base station 120 may include a 5G New Radio (NR) base station (e.g., a gNodeB) and/or a Fourth Generation (4G) Long Term Evolution (LTE) base station (e.g., an eNodeB). Each base station 120 may include devices and/or components configured to enable cellular wireless communication with UE devices 110. For example, base station 120 may include a radio frequency (RF) transceiver configured to communicate with UE devices 110 using a 5G NR air interface using a 5G NR protocol stack, a 4G LTE air interface using a 4G LTE protocol stack, and/or using another type of cellular air interface. Base station 120 may enable communication with core network 150 to enable core network 150 to authenticate UE device 110 with a subscriber management device (e.g., Unified Data Management (UDM) in 5G, Home Subscriber Server (HSS) in 4G, etc.).

RAN 130 may include base stations 120 and be managed by a provider of wireless communication services. RAN 130 may enable UE devices 110 to connect to core network 150 via base stations 120 using cellular wireless signals. For example, RAN 130 may include one or more central units (CUs) and distributed units (DUs) (not shown in FIG. 1) that enable and manage connections from base stations 120 to core network 150. RAN 130 may include features associated with an LTE Advanced (LTE-A) network and/or a 5G core network or other advanced network, such as management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Core network 150 may be managed by the provider of cellular wireless communication services and may manage communication sessions of subscribers connecting to core network 150 via RAN 130. For example, core network 150 may establish an Internet Protocol (IP) connection between UE devices 110 and DN 160. Core network 150 may include a 5G core network, a 4G core network, or a combined 4G/5G network.

The components of core network 150 may be implemented as dedicated hardware components, Virtual Network Functions (VNFs), and/or Containerized Network Functions (CNFs), implemented on top of a common shared physical infrastructure using Software Defined Networking (SDN). For example, an SDN controller may implement one or more of the components of core network 150 using an adapter implementing a VNF virtual machine, a CNF container, an event driven serverless architecture interface, and/or another type of SDN architecture. The common shared physical infrastructure may be implemented using one or more devices 300 described below with reference to FIG. 3 in a cloud computing center associated with core network 150.

Depending on the implementation, core network 150 may include various types of network devices, such as core devices 155. For example, core devices 155 may include a UPF, a SMF, a NRF, a policy control function (PCF), binding support function (BSF), an application function (AF), a network exposure function (NEF), a unified data management (UDM) device, a unified data repository (UDR) device, an Access and mobility Management Function (AMF), a mobility management entity (MME), a packet data network gateway (PGW), a home subscriber server (HSS), an authentication, authorization, and accounting (AAA) server, a policy charging and rules function (PCRF), and/or a charging system (CS). According to other exemplary implementations, core devices 155 may include additional, different, and/or fewer network devices than those described. For example, core devices 155 may include a non-standard and/or a proprietary network device, or another type of network device that may be well-known but not particularly mentioned herein. Core devices 155 may also include a network device that provides a multi-network type functionality (e.g., 4G and 5G), such as an SMF with PGW control plane functionality (e.g., SMF+PGW–C), a UPF with PGW user plane functionality (e.g., UPF+PGW–U), a service capability exposure function (SCEF) with a NEF (SCEF+NEF), and/or other combined nodes (e.g., an HSS with a UDM and/or UDR, an MME with an AMF, etc.). RAN 130 and/or core network 150 may include a public network, a private network, and/or an ad hoc network. According to an exemplary embodiment, a portion of core devices 155 may include logic that provides for BSF service registration and discovery with oversubscribed network addresses, as described herein.

DNs 160-A to 160-Y may each include a packet data network. A particular DN 160 may be associated with an APN and UE device 110 may request a connection to the particular packet data network 160 using the APN. PDN 160 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2A:
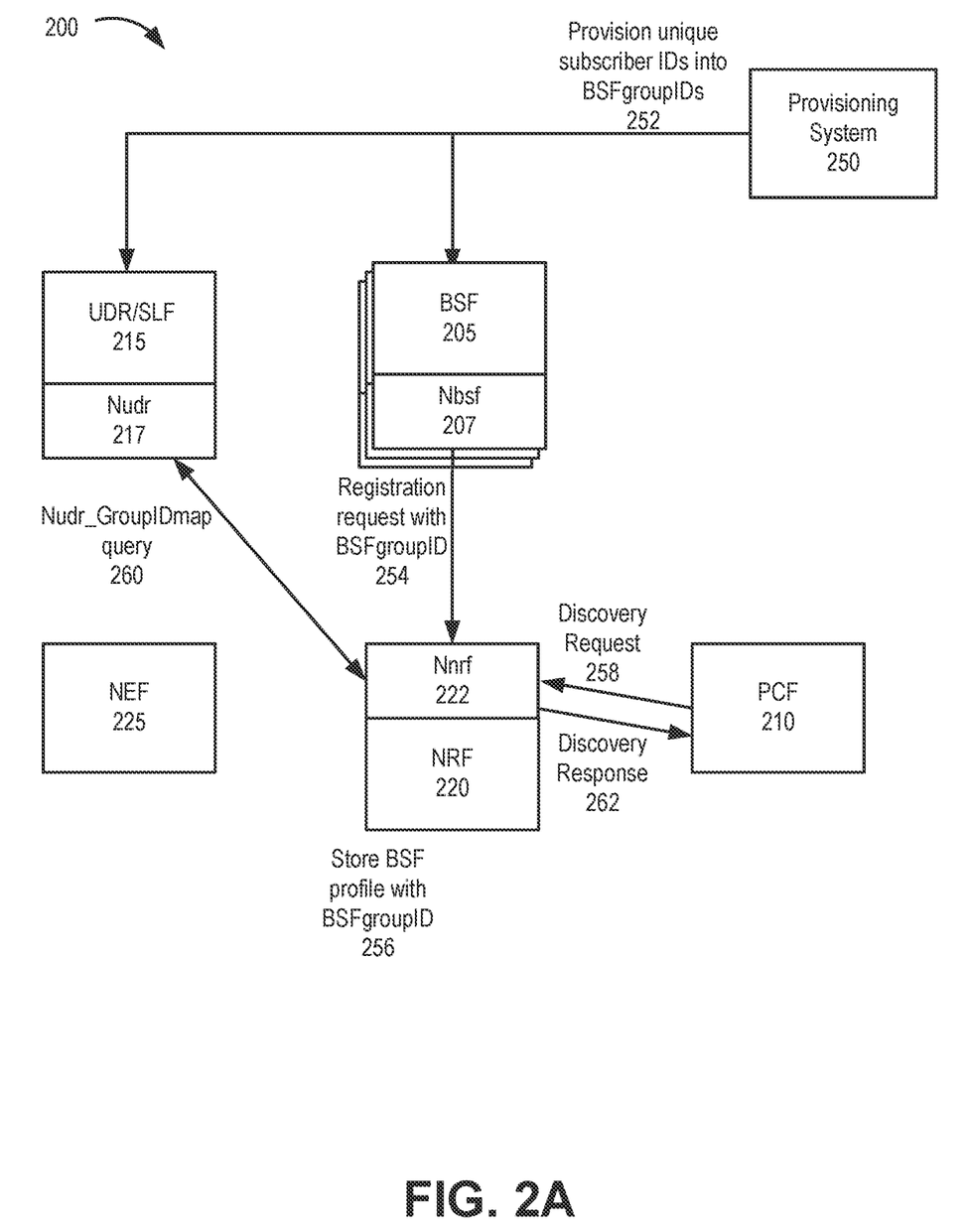
FIGS. 2A and 2B are diagrams illustrating communications among example components using binding support function (BSF) service registration and discovery, according to an implementation described herein.
Figure 2B:
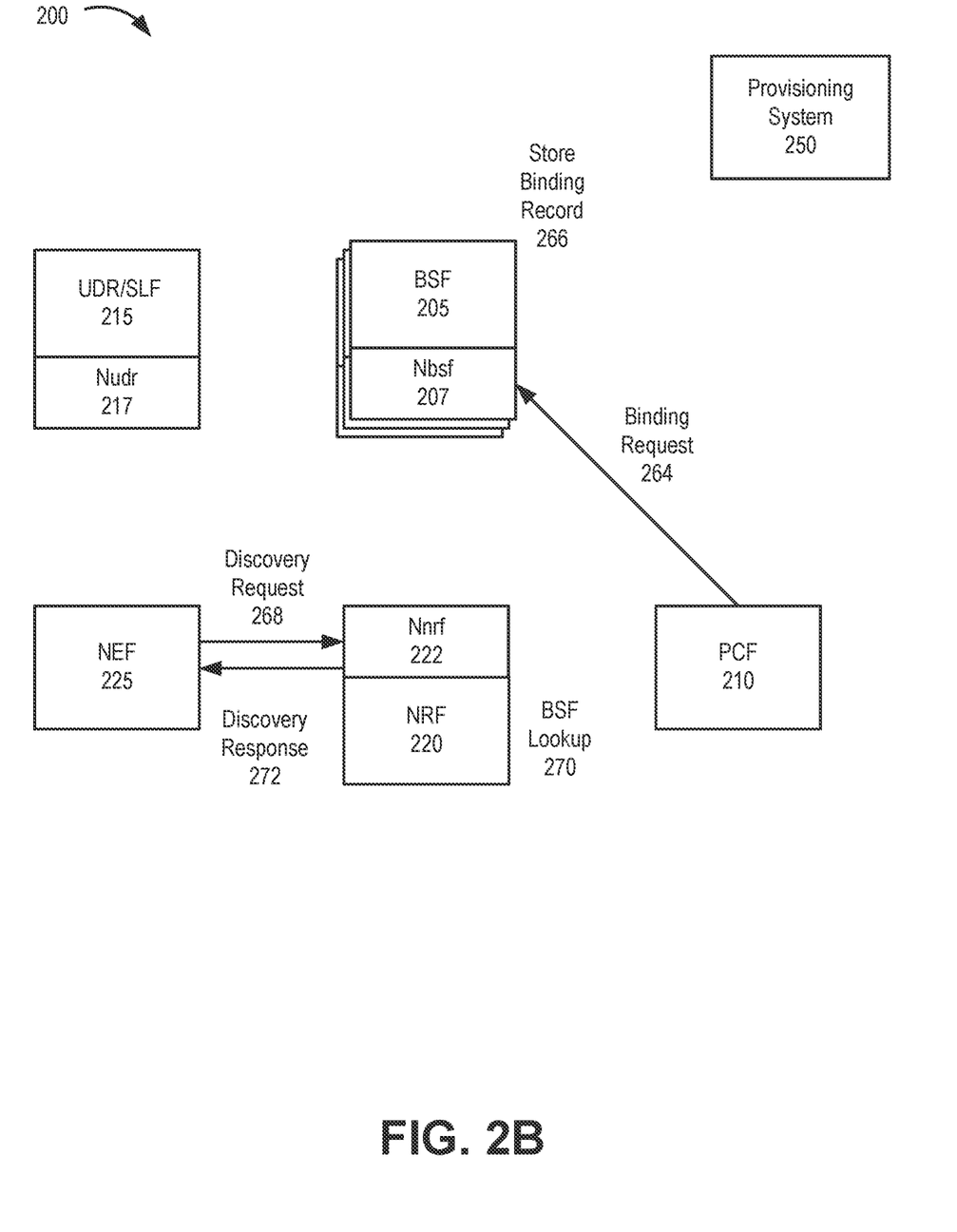

FIGS. 2A and 2B are diagrams illustrating communications among example components in an environment 200 using binding support function (BSF) service registration and discovery. As illustrated, an environment 200 may include a BSF 205, a PCF 210, a UDR and/or a SLF (referred to herein as UDR/SLF 215), a NRF 220, a NEF 225, and a provisioning system 250. Some or all of BSF 205, PCF 210, UDR/SLF 215, NRF 220, NEF 225, and provisioning system 250 may correspond to core devices 155 or to logical network components implemented by core devices 155.

The number, the type, and the arrangement of network devices in environment 200, as illustrated and described, are exemplary. According to other embodiments, environment 200 may include additional, different, and/or fewer devices. For example, according to other embodiments, an application function AF or other network devices (e.g., other core devices 155 and/or network devices of a network external from RAN 130 and/or core network 150) may use the discovery service, as described herein. According to an embodiment, BSF 205, PCF 210, UDR/SLF 215, NRF 220, NEF 225 may each include functions and/or services specified and/or defined by a standards body such as 3GPP, 3GPP2, ITU, ETSI, GSMA, or other types of standards, and/or functions and/or services of a proprietary nature.

BSF 205 may include a network device (e.g., a binding support device) that provides a binding service. The binding service may include a registering service and de-registering service for binding information, and a discovery service that discovers selected policy control network devices, such as selected PCFs. According to some implementations, BSF 205 may be a standalone network device. According to other implementations, the functionality of BSF 205 may be provided individually or in combination with other network devices of core network 150 (e.g., a UDR, an SMF, a PCF, an NRF, etc.) (not illustrated). BSF 205 may support a Service-Based Architecture (SBA) for 5G Core networks, such as core network 150. BSF 205 may enable other network functions (NFs), such as an NEF 225, to determine which PCF to use when environment 200 has oversubscribed IPv4 network addresses.

According to an implementation, in contrast to a known discovery service of the standard or proprietary nature of a BSF, the discovery service of BSF 205 includes support for BSFGroupIDs that permit BSF discovery when an assigned IPv4 address is the same for two different subscribers (e.g., UE devices 110), as described herein. In addition, BSF 205 may include an Nbsf interface 207 that supports communication between BSF 205 and PCF 210 and NRF 220. According to an embodiment, Nbsf interface 207 may support a binding service, as described herein. According to other embodiments, an interface other than an Nbsf interface (e.g., in terms of functionality and/or nomenclature) may be implemented.

PCF 210 may include a network device (e.g., a policy control device) that provides policy control functionalities and information relating to access and mobility management and/or to session management. PCF 210 may register, update, and deregister binding information with BSF 205. Binding information may pertain to PDU sessions and associated UE devices. For example, the binding information may include a network address (e.g., an IPv4 address), a Media Access Control (MAC) address, etc.) of UE device 110 and an identifier of PCF 210. The binding information may include other types of information, such as a Data Network Name (DNN), a SUPI, and IMSI, a Generic Public Subscription Identifier (GPSI), Single Network Slice Selection Assistance Information (S-NSSAI), and/or other types of identifiers (e.g., a Globally Unique Temporary Identifier (GUTI), a Permanent Equipment Identifier (PEI), a Subscription Concealed Identifier (SUCI), a PDU session identifier, etc.). According to other implementations, the binding information may include additional, fewer, and/or different instances of information. PCF 210 may register and deregister binding information associated with UE device 110 and PDU sessions.

UDR/SLF 215 may maintain subscription information for UE devices 110, manage subscriptions, generate authentication credentials, handle user identification, perform access authorization based on subscription data, perform NF registration management, maintain service and/or session continuity by maintaining assignment of NFs for ongoing sessions, and/or perform other processes associated with managing user data. UDR/SLF 215 may provide a unified data a structure that is accessible to a number of functional elements. For example, UDR/SLF 215 may support storage and retrieval of structured data for exposure to NRF 220, policy data by PCF 210, and application data by NEF 225. An SLF component of UDR/SLF 215 may perform certain service discovery functions, such as BSF discovery based on a BSFgroupID, as described further herein. UDR/SLF 215 may be accessible, for example, via a Nudr interface 217.

According to other embodiments, an interface other than an Nudr interface (e.g., in terms of functionality and/or nomenclature) may be implemented.

NRF 220 may support a service discovery function and maintain a profile of available network function (NF) instances and their supported services. An NF profile may include an NF instance identifier (ID), an NF type, a Public Land Mobile Network identifier (PLMN-ID) associated with the NF, a network slice ID associated with the NF, capacity information for the NF, service authorization information for the NF, supported services associated with the NF, endpoint information for each supported service associated with the NF, and/or other types of NF information. According to implementations described herein, NRF 220 may store or access BSF information (BSFinfo) that includes a binding group identifier (e.g., BSFgroupID). As described further in connection with FIG. 4, a BSFgroupID may associate a BSF with a particular group of end device identifiers (e.g., IMSI group, SUPI group, etc.).

NRF 220 may be accessible via an Nnrf interface 222 that supports communication between NRF 220 and PCF 210 or UDR/SLF 215. According to an embodiment, Nnrf interface 222 may support a binding service that includes an embodiment of the BSF discovery service described herein. According to other exemplary embodiments, an interface other than an Nnrf interface (e.g., in terms of functionality and/or nomenclature) may be implemented.

NEF 225 may include a network device that may expose, to external devices, services, capabilities, and events provided by other network devices. NEF 225 may also securely provision information from external network devices and translate internal and external information relative core network 150. According to an implementation, NEF 225 may discover through a query to SLF/NRF 220 which BSF 205 serves the specific SUPI/IMSI and therefore find the correct binding information for UE device 110.

Provisioning system 250 may include a network device that performs network provisioning 252 for BSF 205 and/or SLF/NRF 220. Network provisioning 252 may provide, for example, access management (AM) subscription data, session management (SM) subscription data, and short message service (SMS) subscription data (referred to collectively as "subscription data"), policy data, structured data for exposure, and application data. According to implementations described herein, provisioning system 250 may provision a BSFgroupID in a BSF profile (e.g., BSFinfo). SLF/NRF 220 may receive and store the BSFgroupID with a BSF profile. Individual BSFs 205 may be provisioned into one of multiple (e.g., two or more) groups that service particular ISMIs or SUPIs.

Referring to FIG. 2A, after BSFgroupIDs are defined to divide BSFs 205 into two more groups, provisioning system 250 may provision 252 unique subscriber identifiers (e.g., IMSI, SUPI, GPSI, etc.) into the respective BSF groups. That is, each unique subscriber identifier may be assigned to a BSFgroupID (e.g., based on defined criteria provided to provisioning system 250). In some implementations, provisioning system 250 may also provision UDR/SLF 215 to associate each BSFgroupID with different ranges of unique subscriber identifiers.

Once provisioned, each BSF 205 may send a registration request 254 to register with NRF 220. Registration request 254 may include the assigned binding group identifier for BSF 205. NRF 220 may receive registration request 254 and store 256 a profile, for the BSF 250, that includes the BSFgroupID. At some later time, PCF 210 may provide to NRF 220 a discovery request 258 that includes an IPv4 address and a unique subscriber identifier (e.g., IMSI, SUPI, GPSI, etc.) for a PDU session. NRF 220 may receive discovery request 258 and, in response, perform a lookup to match the unique subscriber identifier to the corresponding BSFgroupID. In one implementation, NRF 220 may query UDR/SLF 215 to obtain the BSFgroupID associated with a particular IMSI or SUPI. For example, NRF 220 may provide a Nurd_GroupIDmap query 260 to UDR/SLF 215 to determine which BSFgroupID the unique subscriber identifier is associated with. NRF 220 may use the BDFgroupID obtained from query 260 to select the appropriate BSF 205 for PCF 210 and provide the selected BSF information to PCF 210 in a discovery response 262.

Referring to FIG. 2B, PCF 210 may use the BSF information in discovery response 262 to provide a binding request 264 to BSF 205. Binding request 264 may include an identifier for PCF 210, a session ID, an IPv4 address, and the unique subscriber identifier that was provided in discovery request 258. BSF 205 may receive binding request 264 and use the binding request to create/store a binding record that associates PCF 210 with the session (e.g., a PDU session) for the UE device 110 that corresponds to the unique subscriber identifier.

At some time after discovery response 262 and/or binding request 264, a network function, such as NEF 225, may need to identify the PCF associated with the session. NEF 225 may generate a discovery request 268 that includes an IPv4 address and the unique subscriber identifier of UE device 110. NRF 220 may receive discovery request 268 and, in response, may perform a lookup 270 to match the IPv4 address and unique subscriber identifier with attributes in a BSF profile (e.g., BSFinfo data type 400 described below). NRF 220 may send to NEF 225 a discovery response 272 that identifies the BSF 205 for the requested session.

The communications and messages for the BSF discovery service illustrated in FIGS. 2A and 2B are exemplary. According to other embodiments and scenarios, the process may include additional operations, fewer operations, and/or different operations. For example, other network functions besides NEF 225 may provide discovery requests to NRF 220.

Figure 3:
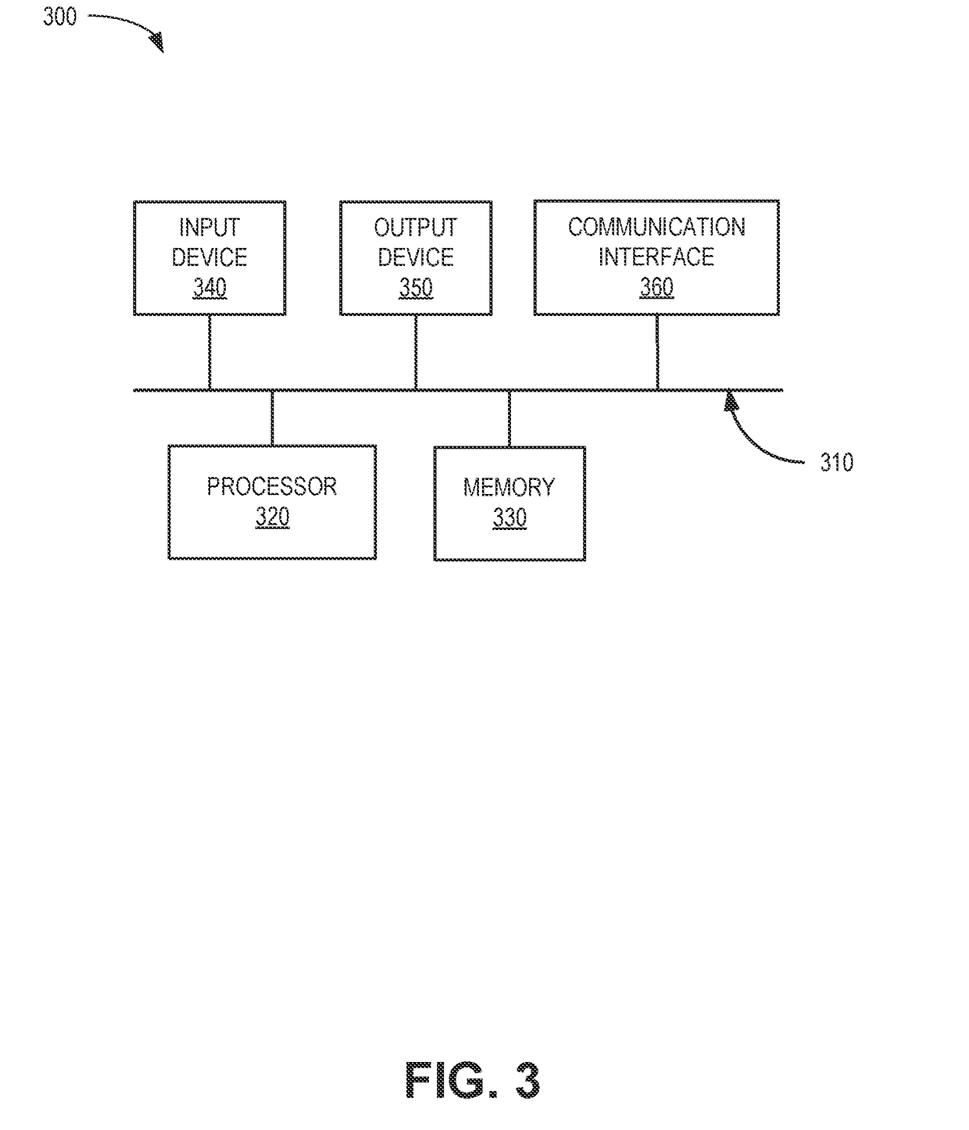
FIG. 3 is a diagram illustrating example components of a device that may correspond to one or more of the devices illustrated and described herein.

FIG. 3 is a diagram illustrating example components of a device 300 according to an implementation described herein. Each of the components of FIGS. 1, 2A, and 2B may include, or be implemented on, one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some implementations, device 300 may be managed remotely and may not include input device 340.

Output device 350 may output information to an operator of device 300. Output device 350 may include a display, a printer, a speaker, and/or another type of output device. For example, device 300 may include a display, which may include a liquid-crystal display (LCD) for displaying content to the user. In some implementations, device 300 may be managed remotely and may not include output device 350.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a Wi-Fi card) for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to BSF service registration and discovery. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
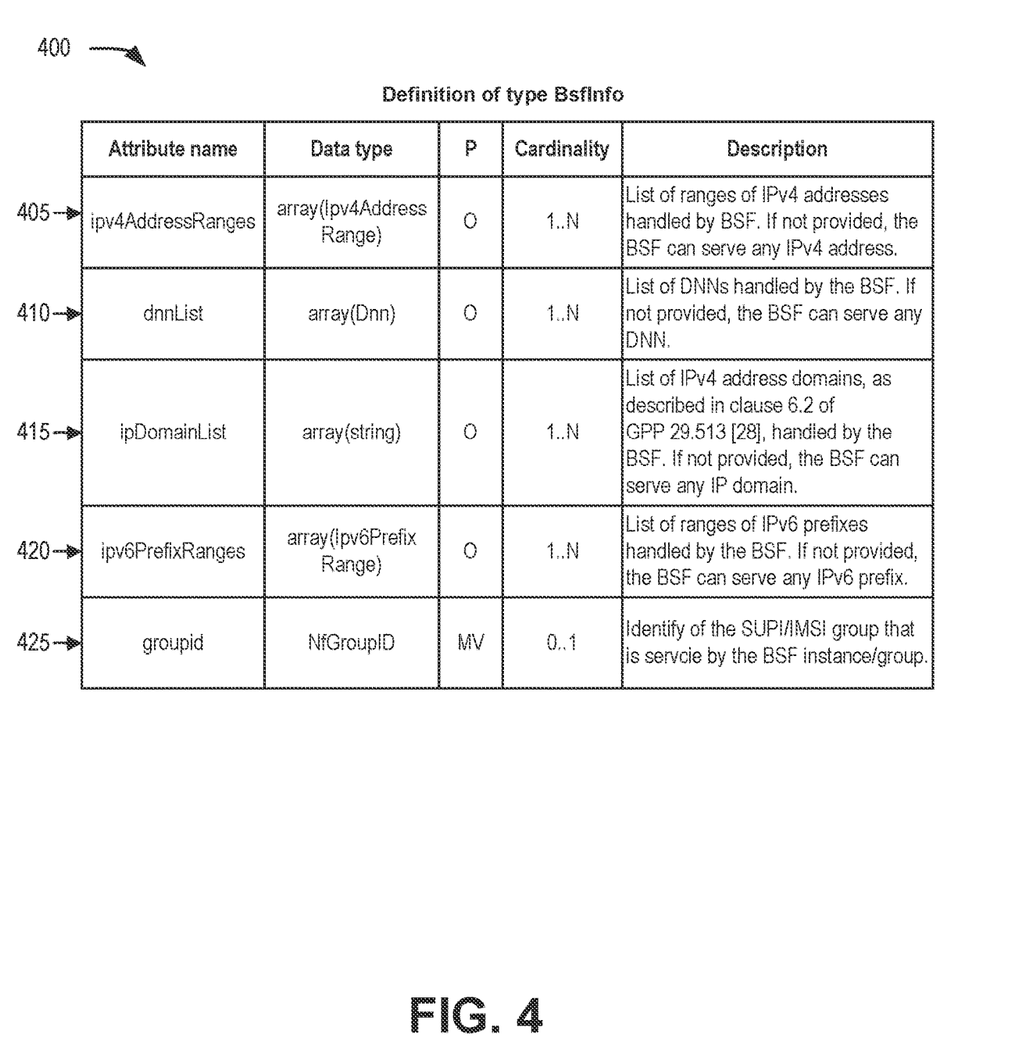
FIG. 4 is a diagram illustrating parameters of a BSFinfo data type, according to an implementation.

FIG. 4 is a diagram illustrating parameters of a BSFinfo data type 400. According to an implementation, the parameters for BSFinfo may be defined in a structured data type according to a format for wireless network standards, such as a 3GPP standard, or another schema.

As shown in FIG. 4, the BSFinfo data type 400 may include a list of attributes 405-425, with each attribute including an attribute name, a data type, a presence (P) indicator, a cardinality indicator, and a description. According to implementations described herein, a new attribute, groupid attribute 425, may be added to a set of previously-known attributes 405-420 for the BSFinfo data type 400. Groupid attribute 425 may define attributes for a BSFgroupID associated with a particular BSF 205 or BSF group.

When an assigned IPv4 address is the same for two different subscribers (e.g., as a result of CG-NAT oversubscription practices, as described above), the ipv4AddressRanges attribute 405 is no longer a unique key to find a subscriber or its assigned session registered in the BSF. Thus, a new attribute, groupid attribute 425, is provided. The groupid attribute 425 may associate a BSF with a set of ISMIs/SUPIs, such that BSFs assigned to the same IPv4 address (e.g., used in different regions) can be differentiated.

The form of an attribute data type that may be used for BSFinfo data type 400 illustrated in FIG. 4 is exemplary. The number of attributes, the range of values, and the representation of each attribute may differ in other implementations.

Figure 5:
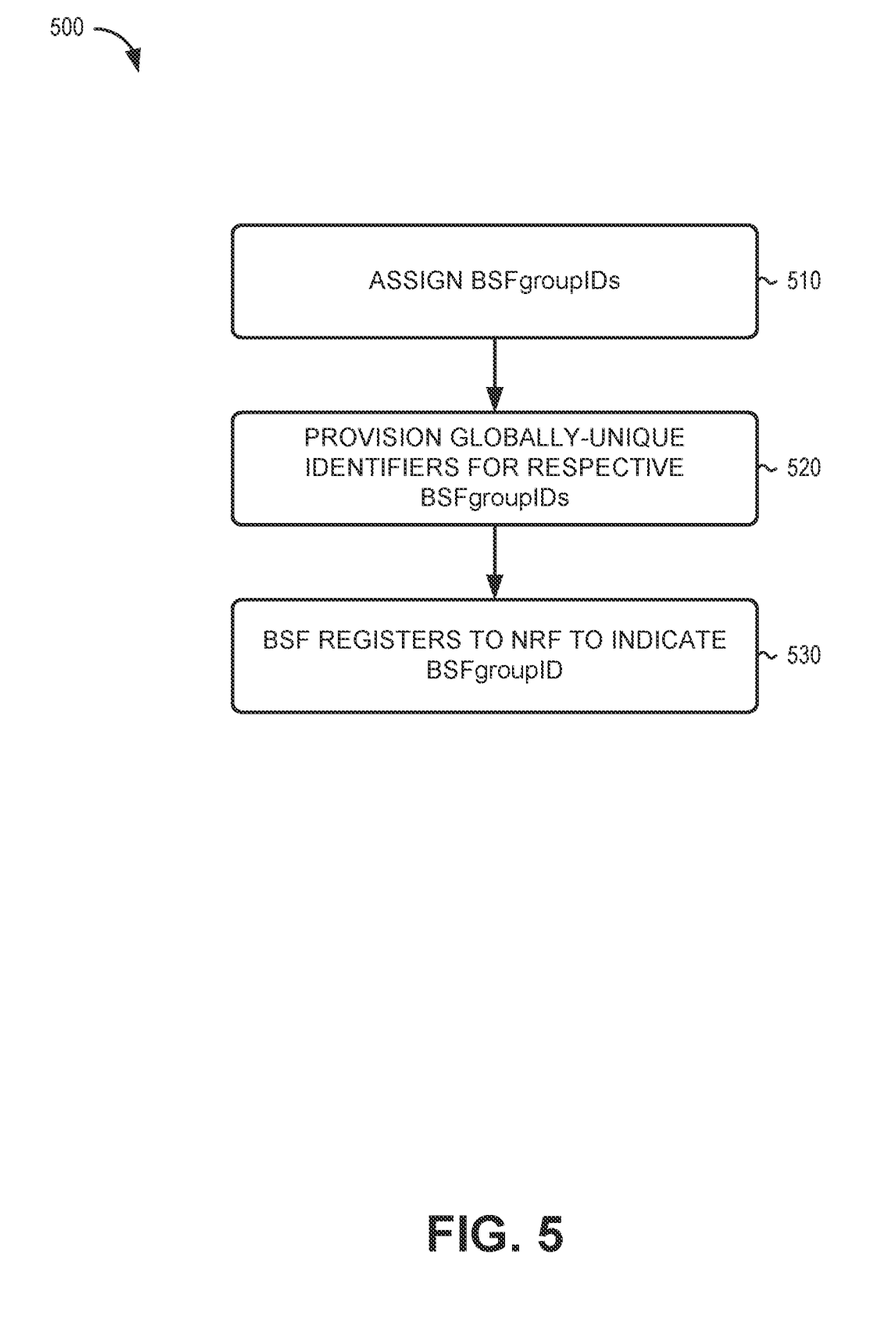
FIG. 5 is a flow diagram illustrating an example process for performing BSF service registration, according to an implementation described herein.

FIG. 5 is a flow diagram illustrating an exemplary process 500 for performing BSF service registration in a system with oversubscribed IPv4 addresses. In one implementation, process 500 may be performed by one or more core devices 155. In another implementation, process 500 may be implemented by one or more other devices in addition to core devices 155.

Referring to FIG. 5, process 500 may include assigning BSFgroupIDs (block 510) and provisioning globally-unique identifiers for the respective BSFgroupIDs (block 520). For example, using provisioning system 250, BSFgroupIDs may be defined for associating with groups of BSF 205. The BSFgroupIDs may, for example, differentiate between national regions (e.g., east/west) or another type of division. According to different implementations, there may be two, three, or more BSFgroupIDs. Provisioning system 250 may provision globally-unique UE identifiers (e.g., IMSI/SUPI/GPSI) into one of the respective BSF groups per a given criteria. Thus, in an example where two BSFgroupIDs are used, each IMSIs/SUPIs may be associated (e.g., by ranges) with either a first or second BSFgroupID.

Process 500 may further include a BSF registering with an NRF to indicate a BSFgroupID (block 530). For example, when BSF 205 registers with NRF 222, BSF 205 may provide its assigned BSFgroupID. In one implementation, the BSFgroupID may be included in a BSF profile, such as a BSFinfo data type 400, described above.

Figure 6:
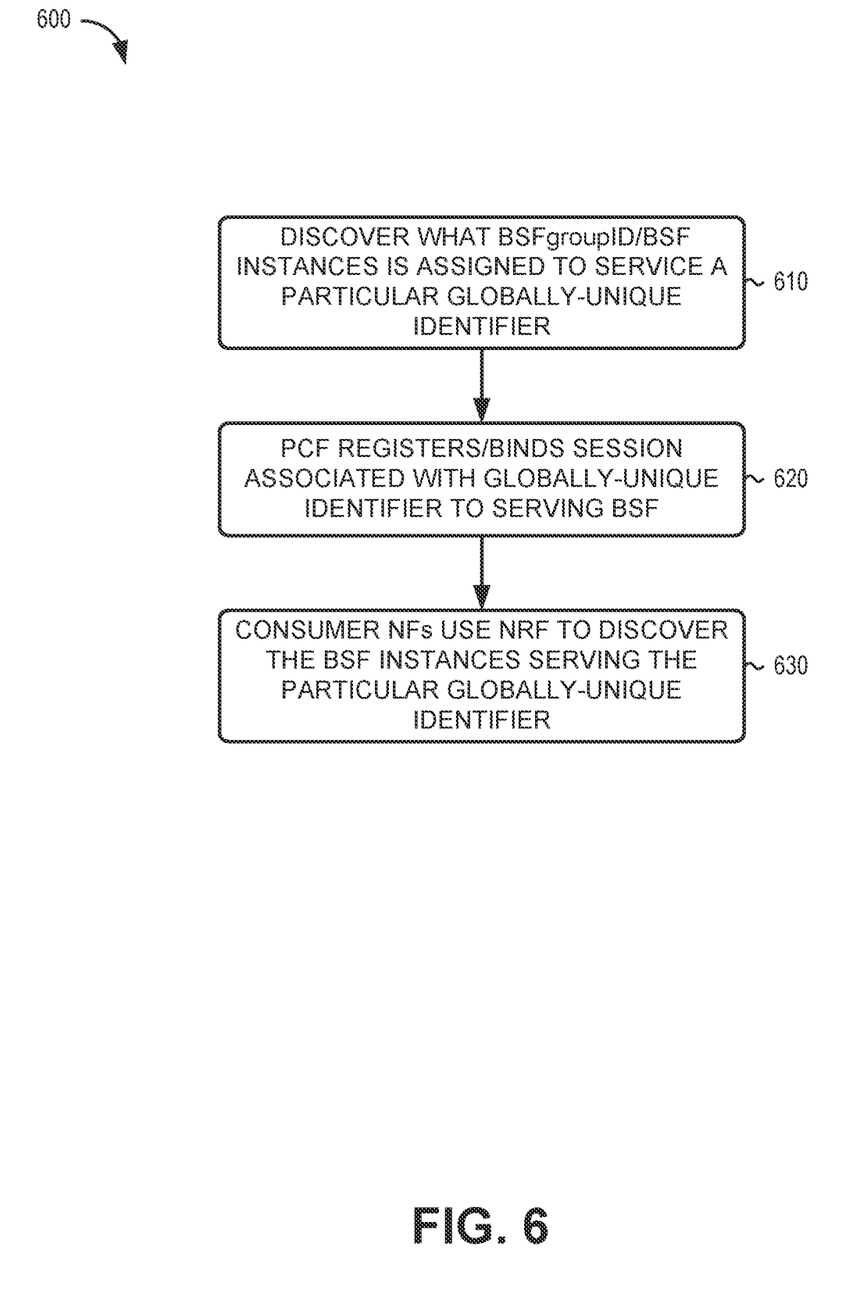
FIG. 6 is a flow diagram illustrating an example process for performing BSF discovery, according to an implementation described herein.

FIG. 6 is a flow diagram illustrating an exemplary process 600 for performing BSF discovery in a system with oversubscribed IPv4 addresses. In one implementation, process 600 may be performed by one or more core devices 155. In another implementation, process 600 may be implemented by one or more other devices in addition to core devices 155.

Process 600 may include discovering what BSFgroupID and BSF instance service a particular UE identifier (block 610). For example, at session establishment, PCF 210, NEF 225, or another network function may use NRF 220 to discover what BSF 205 instances service a particular globally-unique identifier (e.g., a SUPI) associated with a UE device (e.g., UE device 110). Using stored BSF profiles (e.g., including BSFinfo data type 400), NRF 220 may identify, for example, what BSFgroupID is assigned to a SUPI of a particular UE device to be serviced by a BSF. NRF 220 may provide the appropriate BSF 205 network address to PCF 210.

Process 600 may further include registering and/or binding a session associated with the unique identifier to the serving BSF (block 620). For example, using the appropriate BSF 205 network address received from NRF 220, PCF 210 may select and register/bind the session associated with the SUPI to the serving BSF with the matching BSFgroupID.

Process 600 may also include consumer network functions using the NRF to discover the BSF instance serving the particular globally-unique identifier (block 630). For example, other consumer NFs, such as NEF 225, can discover through a query to NRF 220 which BSF 205 (e.g., with BSFgroupID) serves the specific SUPI, and therefore find the binding session.

Systems and methods described herein provide binding support function (BSF) service registration and discovery for environments using oversubscribed network addresses. A network device in a core network may receive a registration request from a binding support device. The registration request may include a binding group identifier associated with the binding support device. The network device may store, based on the registration request, a profile for the binding support device. The profile may include the binding group identifier. The network device may receive, from a policy control device, a discovery request that includes a unique identifier of a user equipment (UE) device. The network device may provide, to the policy control device, a response to the discovery request that identifies the binding support device.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 5 and 6, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
receiving, by a network repository function (NRF) device, multiple registration requests from different binding support devices, wherein each of the registration requests includes a binding group identifier associated with a binding support device and wherein the binding group identifier associates the binding support device with a group of user equipment (UE) identifiers;
storing, by the NRF device and based on the registration requests, a profile for each of the binding support devices, wherein the profile includes the binding group identifier;
receiving, by the NRF device and from a policy control device, a discovery request that includes a unique UE identifier; and
providing, by the NRF device and to the policy control device, a response to the discovery request, wherein providing the response includes querying a unified data repository (UDR) device to match the unique UE identifier to one of the binding group identifiers, and wherein the response identifies one of the binding support devices based on the unique UE identifier and the one of the binding group identifiers.

2. The method of claim 1, further comprising:
receiving, by the NRF device and after the providing, a second discovery request from a consumer network function, wherein the second discovery request includes the unique UE identifier;
associating, by the NRF device, the unique UE identifier with the binding support device based on the profile; and
sending, by the NRF device and to the consumer network function, a response to the second discovery request, wherein the response to the second discovery request identifies the binding support device.

3. The method of claim 1, further comprising:
provisioning, by a provisioning system, the binding support devices with one of the binding group identifiers that is associated with a set of unique UE identifiers.

4. The method of claim 1, wherein the discovery request includes a network address that is assigned to at least two different subscribers.

5. The method of claim 1, wherein the binding support device includes a binding support function of a core network.

6. The method of claim 1, wherein the unique UE identifier includes one of an International Mobile Subscriber Identity (IMSI) or a Subscription Permanent Identifier (SUPI).

7. The method of claim 1, wherein the unique UE identifier includes a Generic Public Subscription Identifier (GPSI).

8. The method of claim 1, further comprising:
receiving, by the binding support device and from the policy control device, a binding request including binding information, wherein the binding information associates the policy control device with a session for a UE device; and
storing, by the binding support device, the binding information.

9. The method of claim 1, wherein the discovery request further includes an Internet Protocol version 4 (IPv4) address that is assigned to at least two different UE devices.

10. A system comprising:
a network device including a first processor configured to:
receive multiple registration requests from different binding support devices, wherein each of the registration requests includes a binding group identifier associated with a binding support device and wherein the binding group identifier associates the binding support device with a group of user equipment (UE) identifiers;
store, based on the registration requests, a profile for each of the binding support devices, wherein the profile includes the binding group identifier;
receive, from a policy control device, a discovery request that includes a unique UE identifier;
query a unified data repository (UDR) device to match the unique UE identifier to one of the binding group identifiers; and
provide, to the policy control device, a response to the discovery request, wherein the response identifies one of the binding support devices based on the unique UE identifier and the one of the binding group identifiers.

11. The system of claim 10, further comprising:
a binding support device including a second processor configured to:
receive, from the policy control device, a binding request including binding information, wherein the binding information associates the policy control device with a session for a UE device; and store, by the binding support device, the binding information.

12. The system of claim 10, wherein the first processor is further configured to:

receive, after the providing, a second discovery request from a consumer network function, wherein the second discovery request includes the unique UE identifier;

associate the unique UE identifier with the binding support device based on the profile; and send, to the consumer network function, a response to the second discovery request, wherein the response to the second discovery request identifies the binding support device.

13. The system of claim 10, further comprising:

a provisioning device including a third processor configured to:

provision the binding support devices with one of the binding group identifiers that is associated with a set of unique UE identifiers.

14. The system of claim 10, wherein the discovery request includes an Internet Protocol version 4 (IPv4) address that is assigned to at least two different subscribers.

15. The system of claim 10, wherein the network device includes a network repository function (NRF) of a core network.

16. The system of claim 10, wherein the unique UE identifier includes one of an International Mobile Subscriber Identity (IMSI), a Subscription Permanent Identifier (SUPI), or a Generic Public Subscription Identifier (GPSI).

17. A non-transitory, computer-readable storage medium storing instructions, executable by a processor of a network device, for:

receiving, by a network repository function (NRF) device, multiple registration requests from different binding support devices, wherein each of the registration requests includes a binding group identifier associated with a binding support device and wherein the binding group identifier associates the binding support device with a group of user equipment (UE) identifiers;

storing, by the NRF device and based on the registration requests, a profile for each of the binding support devices, wherein the profile includes the binding group identifier;

receiving, by the NRF device and from a policy control device, a discovery request that includes a unique UE identifier; and providing, by the NRF device and to the policy control device, a response to the discovery request, wherein providing the response includes querying a unified data repository (UDR) device to match the unique UE identifier to one of the binding group identifiers, and wherein the response identifies one of the binding support devices based on the unique UE identifier and the one of the binding group identifiers.

18. The non-transitory, computer-readable storage medium of claim 17, wherein the instructions are further for:

receiving, by the NRF and after the providing, a second discovery request from a consumer network function, wherein the second discovery request includes the unique UE identifier;

associating, by the NRF device, the unique UE identifier with the binding support device based on the profile; and sending, by the NRF and to the consumer network function, a response to the second discovery request, wherein the response to the second discovery request identifies the binding support device.

19. The non-transitory, computer-readable storage medium of claim 17, wherein the unique UE identifier includes one of an International Mobile Subscriber Identity (IMSI), a Subscription Permanent Identifier (SUPI), or a Generic Public Subscription Identifier (GPSI).

20. The non-transitory, computer-readable storage medium of claim 17, wherein the discovery request further includes an Internet Protocol version 4 (IPv4) address that is assigned to at least two different UE devices.

* * * * *